Jan. 25, 1938.  L. H. MORIN  2,106,505
POT FOR DIE CASTING MACHINES
Filed July 1, 1936
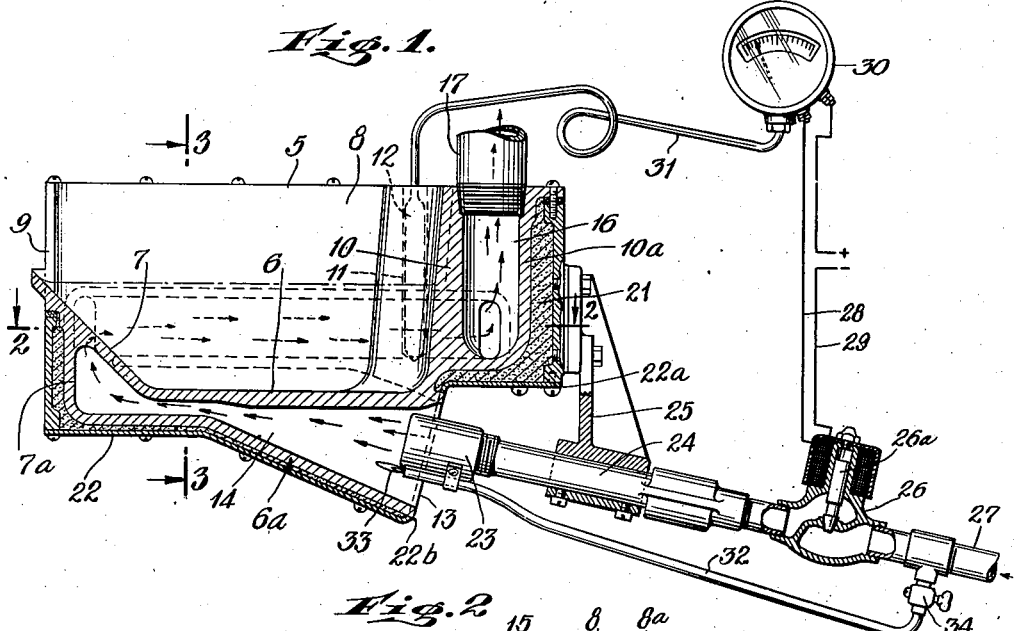
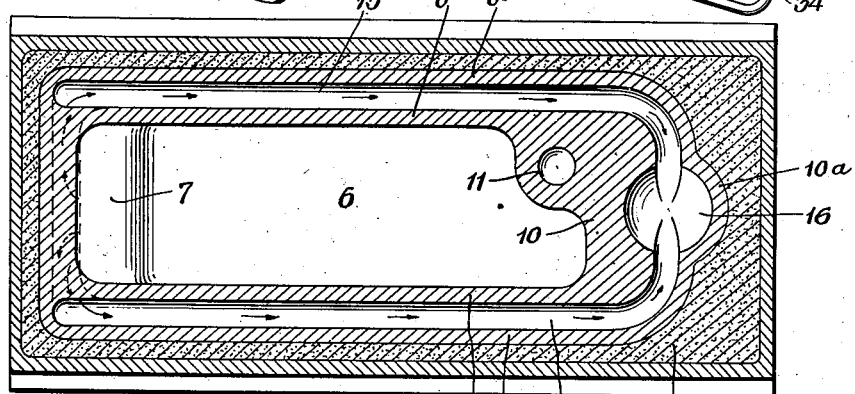
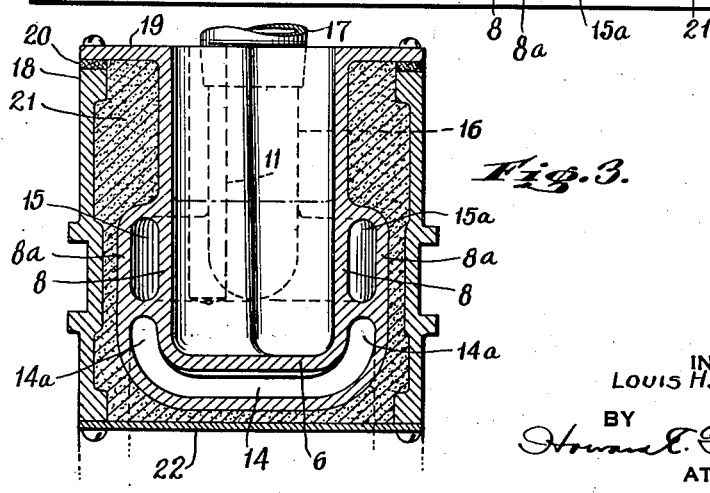
INVENTOR
Louis H. Morin
BY
Howard E. Thompson
ATTORNEY Patented Jan. 25, 1938

2,106,505

UNITED STATES PATENT OFFICE 2,106,505

POT FOR DIE CASTING MACHINES

Louis H. Morin, Bronx, N. Y., assignor to Whitehall Patents Corporation, New York, N. Y., a corporation of New York Application July 1, 1936, Serial No. 88,363

8 Claims. (Cl. 263—14)

This invention relates to die casting machines and particularly, the melting pot for melting the casting material employed in machines of this kind; and the object of the invention is to provide improved means for circulating the products of combustion from a burner through the pot in order to provide for the greatest possible transmission of heat units to the pot and material therein and to reduce the exhaust or stack temperature so as to provide a very efficient and economical means for heating the casting material employed and for maintaining the same at a substantially constant temperature; a further object being to provide means for automatically controlling the burner operation to maintain a substantially fixed temperature of the casting material; a still further object being to provide means for circulating products of combustion forwardly and backwardly through a melting pot and around the walls of said pot, the flame or products of combustion being introduced into an open throat arranged beneath the pot and extending upwardly in the direction of one end thereof and then circulating around the side walls of the pot and exhausted vertically at the other end thereof, means being provided for adjustably and detachably supporting a burner nozzle in position to register with the admission throat of the combustion chamber; a still further object being to provide means for insulating the walls of the pot around the combustion chamber in order to maintain the heat within the chamber and to prevent heat losses by radiation; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal, sectional view through a melting pot made according to my invention, diagrammatically illustrating one method of its use.

Fig. 2 is a section on the line 2—2 of Fig. 1 on an enlarged scale; and,

Fig. 3 is a section on the line 3—3 of Fig. 1 on an enlarged scale.

In the drawing, I have shown at 5 the melting pot of a die casting machine in which metals, alloys or other casting compounds may be placed to be melted and used in the formation of castings, it being understood that a gooseneck or other discharging element will be employed as in other devices of this kind, which gooseneck is omitted solely for the purpose of simplifying the present illustration.

The pot 5 consists of a bottom wall 6 having an upwardly extending and inclined front wall 7, the upper end of which terminates below the side walls 8 to form an opening 9 for the discharge end of the usual gooseneck. The rear wall 10 of the pot proper is of the irregular contour shown in cross section in Fig. 2 of the drawing, said wall being provided with a small vertical chamber 11 opening through the top of the pot and in which a pyrometer bulb 12 is adapted to be arranged as indicated in dotted lines in Fig. 1 of the drawing.

Arranged outwardly of the walls 6, 7, 8 and 10 are supplemental walls 6a, 7a, 8a and 10a. The wall 6a extends outwardly and downwardly to form a wide admission throat 13 for products of combustion which open into a lower combustion chamber 14 which extends between the walls 6, 6a, and 7, 7a and diverges into other circulating chambers 15, 15a between the walls 8, 8a. These chambers open into a common exhaust or flue passage 16 arranged between the walls 10, 10a and preferably of the cross sectional form seen in Fig. 2 of the drawing. The passage 16 opens through the top of the pot and communicates with a flue pipe or stack 17 which is coupled with the upper end of the pot as seen in Fig. 1, and will extend a sufficient height to bring the exhaust above the top of the casting machine, or this pipe may be extended to a suitable outlet if desired.

Upon a consideration of Fig. 3 of the drawing, it will be seen that the passage 14 extends not only across the bottom of the pot but also upwardly along the sides of the bottom wall 6 as is indicated at 14a. The pot 5 is arranged within and insulated from a casing 18 which is tubular in form, or, in other words, consists of side and end walls and is open at the top and bottom. The pot 5 has an outwardly extending top wall 19 which overlies the upper edge of the casing 18 and is secured thereto.

A packing sheet of asbestos 20 is disposed between adjacent surfaces of the parts 18 and 19 as clearly seen in Fig. 3 of the drawing. Powdered or another form of asbestos 21 is disposed between the casing 18 and the walls of the pot 5 as seen in Fig. 3 of the drawing, and a bottom plate 22 is employed to close the lower end of the casing. This plate is of a contour to conform with the contour of the wall 6a and also includes a portion 22a arranged beneath that part of the pot having the chamber 16 therein as seen in Fig. 1 of the drawing. The bottom wall 22 is cut out or open as seen at 22b to register with the opening 13. At 23, I have shown the burner nozzle which in the construction shown is in the form of a gas burner nozzle and is supported at one end of a tubular mixing chamber 24 which is adjustably supported in connection with a bracket 25 bolted to the casing 18 as seen in Fig. 1 of the drawing so as to adjust the nozzle 23 toward and from the throat 13. At 26, I have shown an electric solenoid control valve arranged between the gas supply pipe 27 and the mixing chamber 24. The solenoid of the valve 26 is in an electric circuit represented by the wires 28 and 29 which is also in circuit with a pyrometer control 30, the latter being placed in communication with the bulb 12 through a bulb tube 31 as shown. With this construction, the supply of gas to the burner may be automatically controlled to maintain a substantially constant temperature of the casting material employed in the pot 5, the valve elements 26a of the valve 26 being automatically opened and closed in this operation. At 32, I have shown a pilot pipe, the end of which terminates at the nozzle 23 to provide a pilot light as is indicated at 33 for automatically igniting the burner whenever desired. The pilot light is controlled by the valve 34.

In the operation of melting a suitable casting material in the pot 5 and maintaining this material at a constant temperature, the burner will be operated from time to time through a given run of a casting machine and the burner will continue to operate until the desired temperature of the casting material is reached, after which the burner will be automatically shut off and again automatically relighted when the temperature of the casting material is lowered to a predetermined degree or in the operation of replenishing the supply of the casting material to the pot as and when it may be necessary so to do. In other words, the burner is not in constant operation, and in this way, a very economical means is provided for heating casting materials in the pot of casting machines of the kind under consideration. By means of the combustion and heat circulating chambers employed in the pot, a very efficient type of heat transfer is provided, thus providing the greatest amount of efficiency that is reasonably possible.

In the operation of the burner, the flame is applied directly to the bottom wall 6 of the pot, and spreads upwardly at either side at the lower portion of the pot or, in other words, into the chambers 14a, and then the products of combustion pass backwardly along the side walls of the pot through the chambers 15, 15a into the chamber 16 and then out through the stack 17. In operation, I have found that the stacked heat is very low by reason of the efficient means of heat transmission employed.

Other types of burners may be employed in conjunction with my improved pot construction, and furthermore, the shape and contour of the pot may be modified to suit casting machines of various kinds and classes.

Having fully described my invention, what I claim as new and desire to secure by Letters Patent, is:

1. In a die casting machine, a pot for supplying heated casting material to a machine, said pot comprising a unitary body having spaced inner and outer bottom, side and end walls, the space between said walls forming a circulating chamber through which products of combustion may be circulated longitudinally of the pot in at least two directions, the inner bottom wall being horizontally arranged, the outer bottom wall extending downwardly in the direction of one end of the pot and terminating in a flared admission opening through which products of combustion may be introduced for circulation through said chamber, the inner bottom wall being directly exposed to the products of combustion to provide direct heat transfer to the material contained within said pot, and means at the top of the pot for discharging products of combustion from said chamber.

2. In a die casting machine, a pot for supplying heated casting material to a machine, said pot comprising a unitary body having spaced inner and outer bottom, side and end walls, the space between said walls forming a circulating chamber through which products of combustion may be circulated longitudinally of the pot in at least two directions, the inner bottom wall being horizontally arranged, the outer bottom wall extending downwardly in the direction of one end of the pot and terminating in a flared admission opening through which products of combustion may be introduced for circulation through said chamber, the inner bottom wall being directly exposed to the products of combustion to provide direct heat transfer to the material contained within said pot, means at the top of the pot for discharging products of combustion from said chamber, and means at the first-named end of the pot for adjustably supporting a gas burner at an upward inclination to the inner bottom wall of the pot and relatively to the admission opening to said circulating chamber.

3. In a die casting machine, a pot for supplying heated casting material to a machine, said pot comprising a unitary body having spaced inner and outer bottom, side and end walls, the space between said walls forming a circulating chamber through which products of combustion may be circulated longitudinally of the pot in at least two directions, the inner bottom wall being horizontally arranged, the outer bottom wall extending downwardly in the direction of one end of the pot and terminating in a flared admission opening through which products of combustion may be introduced for circulation through said chamber, the inner bottom wall being directly exposed to the products of combustion to provide direct heat transfer to the material contained within said pot, means at the top of the pot for discharging products of combustion from said chamber, means at the first-named end of the pot for adjustably supporting a gas burner at an upward inclination to the inner bottom wall of the pot and relatively to the admission opening to said circulating chamber, the upper end of the pot having outwardly extending flanges, and means comprising a casing arranged in spaced relation to the walls of said pot coupled with said flanges for insulating said pot.

4. In a die casting machine, a pot for supplying heated casting material to a machine, said pot comprising a unitary body having spaced inner and outer bottom, side and end walls, the space between said walls forming a circulating chamber through which products of combustion may be circulated longitudinally of the pot in at least two directions, the inner bottom wall being horizontally arranged, the outer bottom wall extending downwardly in the direction of one end of the pot and terminating in a flared admission opening through which products of combustion may be introduced for circulation through said chamber, the inner bottom wall being directly exposed to the products of combustion to provide direct heat transfer to the material contained within said pot, said chamber opening outwardly through the upper end of the pot for the discharge of products of combustion from said chamber, and the inner wall of the pot at the other end thereof being inclined upwardly and outwardly.

5. In a die casting machine, a pot for supplying heated casting material to a machine, said pot comprising a unitary body having spaced inner and outer bottom, side and end walls, the space between said walls forming a circulating chamber through which products of combustion may be circulated longitudinally of the pot in at least two directions, the inner bottom wall being horizontally arranged, the outer bottom wall extending downwardly in the direction of one end of the pot and terminating in a flared admission opening through which products of combustion may be introduced for circulation through said chamber, the inner bottom wall being directly exposed to the products of combustion to provide direct heat transfer to the material contained within said pot, said chamber opening outwardly through the upper end of the pot for the discharge of products of combustion from said chamber, the inner wall of the pot at the other end thereof being inclined upwardly and outwardly, an enlarged hollow body extending into the compartment of the pot at the first-named end portion thereof, and said hollow body forming a receptacle for a temperature recording element.

6. In a die casting machine, a pot for supplying heated casting material to a machine, said pot comprising a unitary body having spaced inner and outer bottom, side and end walls, the space between said walls forming a circulating chamber through which products of combustion may be circulated longitudinally of the pot in at least two directions, the inner bottom wall being horizontally arranged, the outer bottom wall extending downwardly in the direction of one end of the pot and terminating in a flared dimension opening through which products of combustion may be introduced for circulating through said chamber, said chamber opening outwardly through the upper end of the pot for the discharge of products of combustion from said chamber, a casing encircling the pot in spaced relation to the side walls thereof, means for detachably supporting the casing in connection with the pot, a bottom cover plate for said casing, and a body of insulating material between the walls of said pot, casing and cover plate.

7. A container for the casting material of die casting machines, said container comprising a unitary body, means forming a vertical flue passage at one end of said body, the lower end of said body comprising spaced bottom walls forming therebetween an elongated circulating chamber extending longitudinally of the bottom of the container proper, said chamber having a downwardly flared admission opening and also extending on to the lower sides of the container, side walls of the container having circulating passages placing said vertical flue passage in communication with said circulating chamber whereby products of combustion extending along and directly contacting the inner bottom wall of the container can be circulated through said passages and discharged through said flue to provide substantially direct heat transfer to the material in said container, and means comprising a casing detachable from said container for insulating the exterior of the side and bottom walls of said container.

8. A container for the casting material of die casting machines, said container comprising a unitary body, means forming a vertical flue passage at one end of said body, the lower end of said body comprising spaced bottom walls forming therebetween an elongated circulating chamber extending longitudinally of the bottom of the container proper, said chamber having a downwardly flared admission opening and also extending on to the lower sides of the container, side walls of the container having circulating passages placing said vertical flue passage in communication with said circulating chamber whereby products of combustion extending along and directly contacting the inner bottom wall of the container can be circulated through said passages and discharged through said flue to provide substantially direct heat transfer to the material in said container, means comprising a casing detachable from said container for insulating the exterior of the side and bottom walls of said container, and means for supporting a burner in an upwardly inclined position with respect to the lower portion of the container with the discharge of said burner at the admission opening of said circulating chamber.

LOUIS H. MORIN.